July 21, 1964  H. J. MARSCHAK  3,141,557
SUPPORT FOR A STAND AND THE LIKE
Filed Jan. 15, 1962
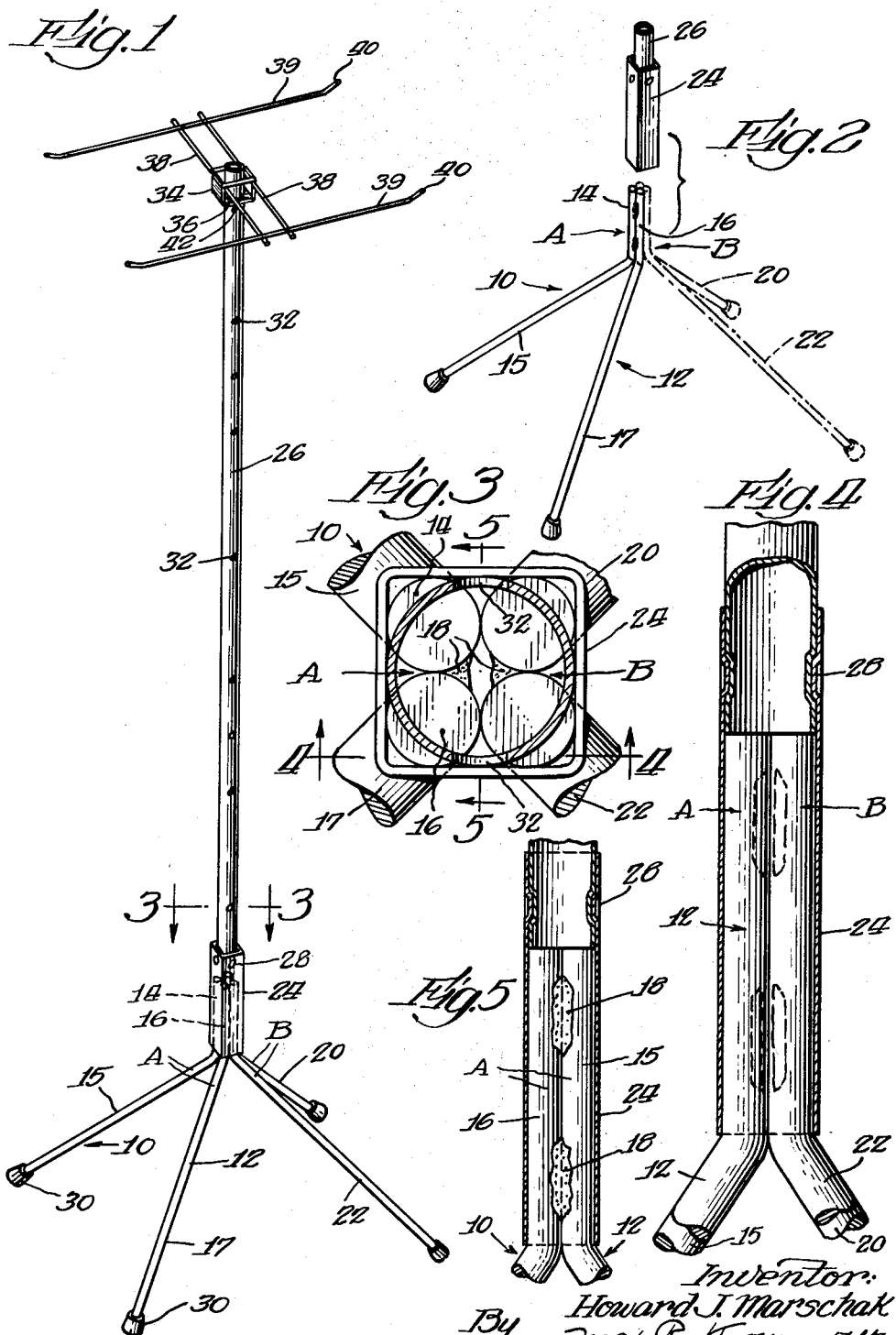

United States Patent Office 3,141,557
Patented July 21, 1964

3,141,557
SUPPORT FOR A STAND AND THE LIKE
Howard J. Marschak, 1544 W. Elmdale Ave.,
Evanston, Ill.
Filed Jan. 15, 1962, Ser. No. 166,050
3 Claims. (Cl. 211—177)

This invention relates to a support for a stand and the like.

One of the objects of this invention is to provide a base or support and the like for a stand, framework, and the like, which may be readily set up or assembled in a minimum of time without the use of tools or fastening elements and which may readily be disassembled and knocked down.

Another object of this invention is to provide a base or support or the like of the foregoing character, which is economical to produce, which is readily assembled and disassembled, and which when disassembled may be packed, shipped and stored in a minimum of space and in a carton of a corresponding minimum size.

Another object of this invention is to provide a structure of the foregoing character which is extremely rigid and stable.

Other objects and advantages will be come apparent as this description progresses.

In the drawings:

FIGURE 1 is a perspective view of a stand with the support of this invention forming the base for the stand;

FIGURE 2 is an exploded view of the leg members and the coupling means;

FIGURE 3 is an enlarged view taken on lines 3—3 of FIGURE 1;

FIGURE 4 is a view partly in cross-section taken on lines 4—4 of FIGURE 3; and

FIGURE 5 is a view partly in cross-section taken on lines 5—5 of FIGURE 3.

The support or base forming this invention is formed of two units which are of identical construction and which are positioned adjacent each other at the upper ends and held in secured position by insertion in a sleeve to form four radially extending legs and provide a firm base. The units may be readily assembled and disassembled without the use of any tools or other fastening means.

The two units, indicated generally by the letters A and B are similarly constructed and each unit is formed of a pair of rods similarly bent and preshaped.

Unit A is formed of two rods, 10 and 12. The rod 10 is preshaped to provide a short vertical upper section 14 and a leg 15 extending downwardly thereof at an inclined angle of approximately 45°. The rod 12 likewise has a short vertical section 16 and a similarly inclined leg 17. The two rods 10 and 12 are welded together as at 18 along their vertical sections 14 and 16, with the legs of each, namely, legs 15 and 17 positioned 90° apart. Unit B is similarly formed of rods 20 and 22. The two units A and B are used for forming a base or support.

To hold such two units together to form a four-legged support or base, the two units A and B are positioned so that the upper vertical sections 14 and 16 of section A are adjacent the similar vertical sections of unit B, as shown in FIGURES 2 and 3, with the four legs spaced and positioned as shown. The legs of unit B are positioned to diverge in the direction opposite to the legs of unit A.

A coupling sleeve 24 generally square-shaped is inserted over the vertical sections 14 and 16 of unit A and corresponding vertical sections of unit B so that the four vertical sections are confined therewithin in a relatively close fit, with the vertical sections engaging the inner walls of the coupling sleeve 24, as best seen in FIGURE 3, to secure the units A and B against relative movement and to provide a support with four spaced legs.

As shown, the coupling sleeve is fixedly secured to the lower end of a tubular member 26 by crimping 28 or by welding. The lower end of the tubular member 26 extends into the coupling sleeve 24 and the upper ends of the vertical sections of the units are positioned thereagainst, as best seen in FIGURES 4 and 5. It is not, however, necessary that the upper ends of the vertical sections engage the bottom of the tubular member 26 as the coupling sleeve 24 will be positioned by the diverging legs. The extremities of each of the legs is covered with a rubber knob 30.

While I have shown the coupling sleeve 24 as a separate member attached to the tubular member 26, it will be understood that the lower end of a tubular member may be formed to substantially the square shape of the coupling sleeve 24 and used as the coupling member, or an elongated tubular member of a substantially square cross-section may be utilized in lieu of the tubular member shown.

FIGURE 1 shows a stand formed with this invention. The tubular member 26 is provided with a plurality of spaced transverse openings 32 and horizontal supports of the character shown and may be supported on said tubular upright. The horizontal support comprises a U-shaped bracket 34 having a central opening 36 whereby it is inserted on the tubular member 26.

Secured to the bracket 34 are wire members 38 to which are secured wire members 39 having pronged ends 40. A pin 42 is inserted in the openings 32 and same engages the underside of the bracket 34 to support same and to permit the horizontal support to be rotated with respect to the tubular upright 26. Any number of horizontal supports may be supported on the tubular upright. Merchandise may be displayed by being hung on the prong ends 40, or the horizontal supports may be used as shelves on which merchandise may be stationarily or rotatably supported.

With a support formed in accordance with this invention, the two separate leg units may be readily put together to form a four-legged support or base without the use of tools or fastening elements. It is merely necessary tò insert same in the coupling element, as shown and described, and the support will be formed.

The support may be readily disassembled by removing same from the coupling sleeve. When disassembled the units A and B take up very little space, consequently, they may be packaged for shipment and storaged in a carton of a reduced size in contrast to other supports which are not capable of being disassembled. The assembling and disassembling are very simple and may be performed by any inexperienced person without the use of tools or the like.

It will be understood that various changes and modifi-

What is claimed is:

1. A knocked down type of support for a display stand comprising a pair of two single units each comprising a pair of rigid members each formed to provide a vertical upper section and a downwardly extending leg, with the two rigid members permanently secure to each other at the vertical upper sections to form a single unit with connected and abutting upper sections and with legs diverging in opposite directions, means for securing said two single units together, said means comprising a continuous tubular member enclosing the vertical upper sections of both said units to hold the vertical sections in abutting relation with the legs of both said units in spaced relation with the legs of one unit extending in a direction opposite to the legs of the other unit, said tubular member being connected to an upright post to support said post.

2. A structure defined in claim 1 in which the means for securing the two single units comprises a generally squared tubular member.

3. A structure defined in claim 1 in which the rigid members consist of rods.

References Cited in the file of this patent

UNITED STATES PATENTS

| | | |
|---|---|---|
| 1,015,183 | Hering | Jan. 16, 1912 |
| 1,280,174 | Dancer | Oct. 1, 1918 |
| 1,591,110 | Willson | July 6, 1926 |
| 1,673,721 | Turner | June 12, 1928 |
| 2,635,167 | Nelson | Apr. 14, 1953 |
| 3,021,960 | Pipe | Feb. 20, 1962 |

FOREIGN PATENTS

| | | |
|---|---|---|
| 214,911 | Germany | Oct. 29, 1909 |